United States Patent [19]
Smith

[11] 3,859,978
[45] Jan. 14, 1975

[54] COOKING DEVICE
[75] Inventor: Donald R. Smith, Kansas City, Mo.
[73] Assignee: Locke Stove Company, Kansas City, Mo.
[22] Filed: Sept. 17, 1973
[21] Appl. No.: 398,222

[52] U.S. Cl. .............................. 126/25 A, 312/351
[51] Int. Cl. ......................... A47j 37/07, F24b 3/00
[58] Field of Search ................ 126/25 A, 25 R, 9 R; 312/351, DIG. 33; 108/13, 16, 107, 144

[56] References Cited
UNITED STATES PATENTS

| | | | |
|---|---|---|---|
| 2,635,434 | 4/1953 | Bently | 312/351 |
| 3,378,002 | 4/1968 | Hink | 126/25 A |
| 3,557,771 | 1/1971 | Koziol | 126/25 A |
| 3,693,534 | 9/1972 | Martin | 126/25 R X |

FOREIGN PATENTS OR APPLICATIONS
1,297,840   5/1962   France................................ 312/351

Primary Examiner—William F. O'Dea
Assistant Examiner—Harold Joyce
Attorney, Agent, or Firm—Fishburn, Gold & Litman

[57] ABSTRACT

A cooking device comprises a compartment having a bottom wall and spaced side walls and opposite end walls and a food supporting grid having opposite side edge portions thereof each adapted to be supported on one of an upper ledge and a lower ledge on a respective one of the side walls of the compartment. The device may be used in any suitable structure and is particularly adapted for barbecue cookers and for outdoor use. The upper ledge and the lower ledge on one of the side walls are in respective vertical spaced relation with the upper ledge and the lower ledge on the other of the side walls and the grid has one side edge portion spaced from or at a different level and substantially parallel with the other side edge portion thereof whereby a center portion of the grid may be selectively positioned at a plurality of levels or elevations above the bottom wall of the compartment.

7 Claims, 5 Drawing Figures

PATENTED JAN 14 1975 3,859,978

PATENTED JAN 14 1975

COOKING DEVICE

The present invention relates to cooking devices and is particularly adapted to an outdoor barbecue unit wherein it is desirable to vary the spacing of a food supporting grid above the heating unit.

The principal objects of the present invention are: to provide a cooking device with a heating unit and a food supporting grid that by change of relative orientation varies the space between the heating unit and grid; to provide such a cooking device that is particularly adapted for outdoor use; to provide such a structure which is versatile in use and has a plurality of vertically spaced ledges in opposing wall panels and the ledges are arranged to selectively support a grid member at a plurality of different levels; to provide such a cooking device wherein a grid member may be selectively turned end-for-end and/or inverted to obtain a plurality of different elevations or positions; and to provide such a cooking device which is durable and weather proof, easy to operate, economical to manufacture, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include an exemplary embodiment of the present invention and illustrate various objects and features of the cooking device.

Figure 1:
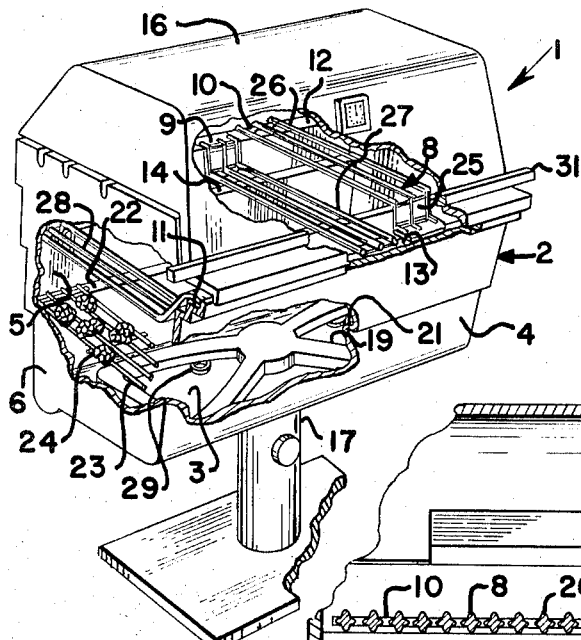
FIG. 1 is a perspective view of a cooking device embodying features of the present invention and with portions broken away to better illustrate the component parts.
Figure 3:
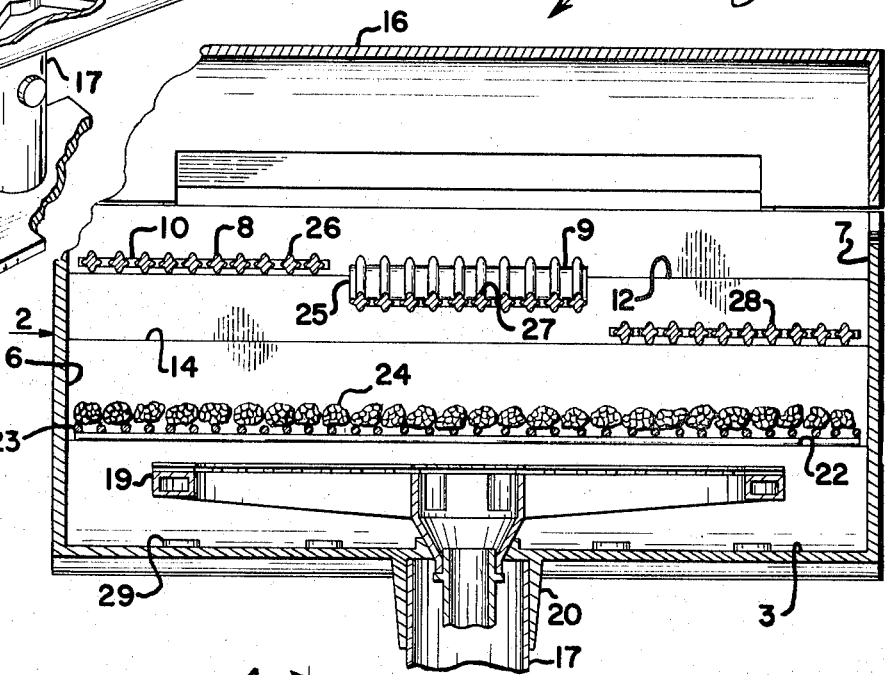
FIG. 3 is a longitudinal sectional view through the cooking device taken on line 3—3, FIG. 2.
Figure 2:
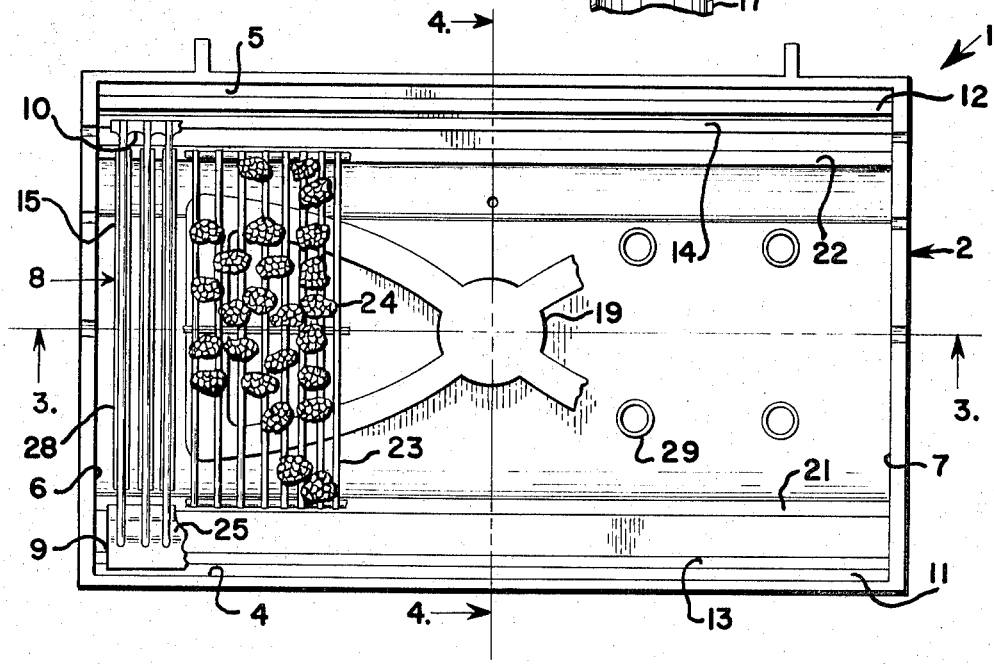
FIG. 2 is a plan view of the cooking device.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a cooking device which may be of any suitable structure for indoor or outdoor use with provisions for varying the vertical spacing between a food supporting grid and a heating unit. The structure illustrated is particularly adapted for outdoor use, such as adjacent a patio, picnic area, or the like.

The cooking device 1 inlcudes a compartment 2 having a bottom wall 3 and spaced opposed walls extending upwardly from the bottom wall 3. The illustrated compartment 2 has spaced front and rear side walls 4 and 5 respectively and opposite end walls 6 and 7 all extending upwardly from the bottom wall 3. A food supporting grid 8 has opposed side members 9 and 10 illustrated as side edge portions having support portions carried thereby and each adapted to be supported on suitable upwardly facing surfaces on certain of the opposed walls of the compartment 2. The upwardly facing surfaces are illustrated as ledges on the front and rear side walls 4 and 5 of the compartment 2 and the orientation of the grid 8 may be changed to change the elevation of the grid 8 relative to a heating unit.

In the illustrated structure, the side walls 4 and 5 have upper ledges 11 and 12 respectively and lower ledges 13 and 14 respectively. The levels of the upper and lower ledges on one of the side walls are different from the levels of the upper and lower ledges on the other side wall, for example, the upper ledge 11 and the lower ledge 13 on the front side wall 4 are in respective vertical spaced relation with the upper ledge 12 and the lower ledge 14 on the rear side wall 5. The grid 8 has one side edge portion, for example, side edge portion 9, spaced above or below and substantially parallel with the other side edge portion 10 whereby a center portion 15 of the food supporting grid 8 may be selectively positioned at a plurality of different positions above the heating unit.

The side walls 4 and 5 are positioned to cooperate with the side edge portions 9 and 10 of the food supporting grid 8 to limit lateral movement of the grid 8 in the compartment 2.

The cooking device 1 may be open or closed during use. In the illustrated structure, the cooking device 1 has a cover 16 hingedly mounted on the compartment 2 and movable between a closed position and an opened position. The cooking device 1 includes a tubular standard 17 which may be permanently installed in or adjacent a patio or the like, as by having the standard 17 secured in position outdoors, for example, having the lower end thereof embodied in a concrete foundation (not shown) within or adjacent a patio.

If it is desired that the cooking device 1 be portable, the tubular standard 17 may have the lower end thereof secured to a suitable base or support member which is adapted to be positioned on a patio, porch, or the like or the base or support member may be mobile and adapted to be moved to a desired location.

The cooking device 1 may include suitable means in the compartment 2 operative to produce heat therein. In the illustrated embodiment, the tubular standard 17 has a conduit or pipe 18 therein adapted to have one end thereof connected to a source of suitable gaseous fuel (not shown) and the conduit or pipe 18 is adapted to have the other end thereof connected to a heating unit or fuel burner 19 positioned in the compartment 2. The cooking device 1 includes a sleeve 20 depending from the bottom wall 3 and the sleeve 20 is adapted to be removably mounted on an upper end of the tubular standard 17.

The fuel burner 19 is operative to produce a continuous flame area when fuel sheets extending therefrom are ignited. The illustrated fuel burner 19 has a plurality of arms each having a substantially continuous fuel port to thereby produce a continuous flame area when fuel sheets extending therefrom are ignited.

When cooking many food items all of which are to be served substantially at the same time, it is necessary to maintain some food items warm, such as vegtables, while cooking other items, such as meat. Therefore, the food items to be maintained at a warm temperature are supported in a position spaced farthest from the fuel burner 19 and the other items being cooked are positioned closer to the fuel burner 19, as later described.

Cooking by radiated heat is preferable to cooking over a flame, therefore, facing surfaces of the front and rear side walls 4 and 5 have shoulders 21 and 22 respectively which are arranged in alignment to support a briquiette rack 23 which is adapted to support a suitable noncombustible heat absorbing and radiating material, such as ceramic, charcoal pieces or chips 24 which are heated by the fuel burner 19.

The upper ledges 11 and 12 and the lower ledges 13 and 14 are spaced above the shoulders 21 and 22 and the ledges 11 to 14 inclusive are arranged to supporrt the food supporting grid 8 at a plurality of positions above the briquette rack 23 and the ceramic, charcoal pieces or chips 24 thereon. The spacing between the food supporting grid 8 and the briquettes or ceramic chips 24 is such that flash burning of grease dripping from meat placed on the food supporting grid 8 will not engage said meat. It is noted that the ceramic chips or briquettes 24 are self cleaning and do not affect the flavor of food cooked within the compartment 2. Flavor is, however, affected by smoke from juices dripping onto glowing briquettes or ceramic chips 24.

The upper ledge 11 on the front side wall 4 is positioned below and substantially parallel with the upper ledge 12 on the other or rear side wall 5. The lower ledge 13 on the front side wall 4 is positioned above and substantially parallel with the lower ledge 14 on the other or rear side wall 5. The upper ledge 12 and the lower ledge 14 on the rear side wall 5 are thereby spaced apart a greater vertical distance than a vertical spacing between the upper ledge 11 and the lower ledge 13 on the front side wall 4.

The spacing of the side members of the food supporting grid 8 is related to the upwardly facing support surfaces in the compartment 2 and the side walls 4 and 5 so that the center portion 15 of the grid 8 is substantially level or horizontal in each of a plurality of positions, illustrated as an upper position 26, an intermediate position 27, and a lower position 28. The support portions on the side members 9 and 10 of the grid 8 may be clips, lugs, ribs, or the like and the upwardly facing surfaces on the opposed walls of the compartment 2 may be lugs, abutments, ledges as desired to receive respective support portions of the grid 8.

Figure 4:
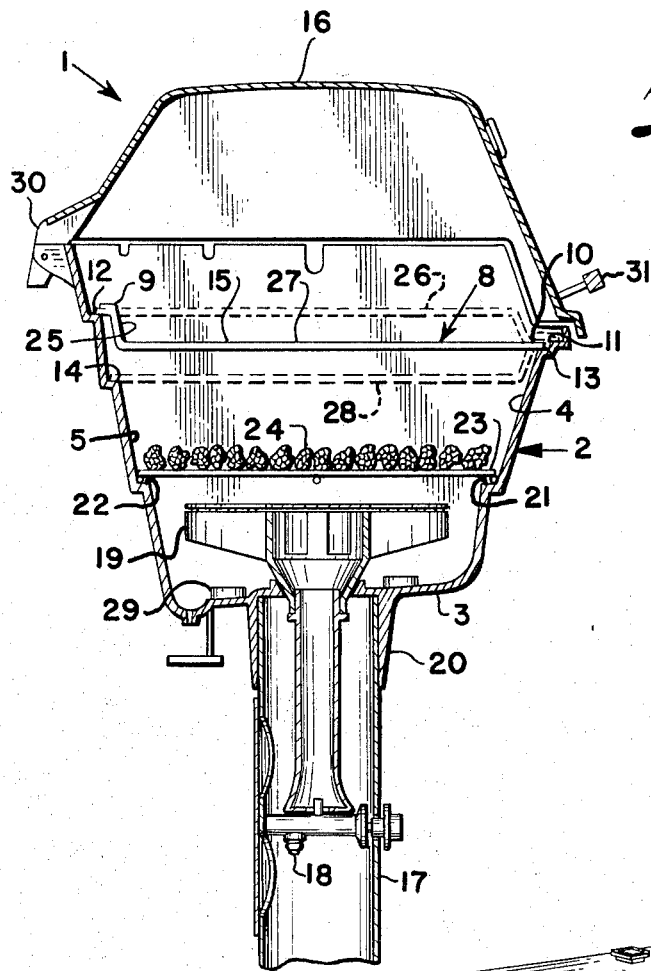
FIG. 4 is a transverse sectional view through the cooking device taken on line 4—4, FIG. 2, and showing alternate positions of a food supporting grid in broken lines.
Figure 5:
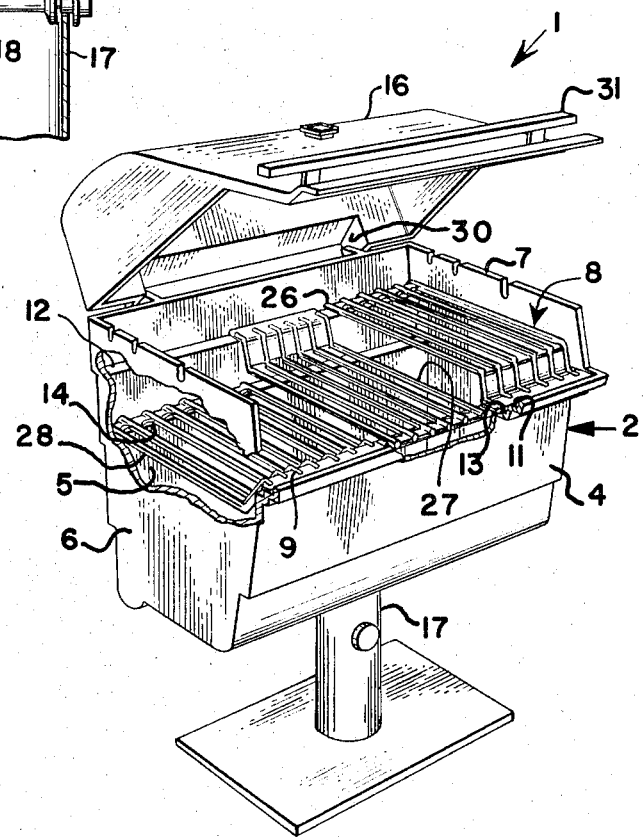
FIG. 5 is a perspective view of the cooking device showing the grid in sections and the sections in different positions.

The food supporting grid 8 has the side edge portions 9 and 10 thereof each adapted to be supported on a respective ledge on a respective side wall of the compartment 2, whereby reversing and inverting the grid 8 permits the center portion 15 of the grid 8 to be selectively positioned at a plurality of different substantially level positions above the bottom wall 3 of the compartment 2. The food supporting grid 8 includes a connecting portion 25 extending between the one side edge portion 9 and the center portion 15 thereof. The one side edge portion 9 and the center portion 15 of the food supporting grid 8 are spaced apart a lesser distance than the vertical spacing between the upper ledge 12 and the lower ledge 14 on the rear side wall 5 and the spacing between the one side edge portion 9 and the center portion 15 of the grid 8 is a greater distance than the vertical spacing between the upper ledge 11 and the lower ledge 13 on the front side wall 4 of the compartment 2 whereby the center portion 15 of the food supporting grid 8 may be selectively positioned in a plurality of different level positions, as best shown in FIG. 4.

The lateral spacing between respective portions of the opposed or facing side walls 4 and 5 and the width of the grid 8 or spacing between the side members 9 and 10 of the grid 8 are coordinated to limit lateral movement of the grid 8 when in supported engagement on the support surfaces on the walls 4 and 5 and thereby prevent separation of the grid 8 from the respective support surfaces on the walls 4 and 5.

Means are provided to permit flow of combustion air into the compartment 2 and escape of smoke and fumes from the compartment 2 when the cover 16 is in the closed position. In the illustrated structure, the bottom wall 3 has a plurality of spaced air passages 29 extending therethrough to permit entry of air to support combustion of fuel by the fuel burner 19. The illustrated cover 16 has suitable hinges 30 each positioned substantially above the food supporting grid 8 within the cooking compartment 2. The cover 16 is shaped to provide a flue passage therethrough between adjacent hinges 30.

The cover 16 preferably has a handle 31 mounted thereon and positioned to extend beyond opposite ends of the compartment 2 whereby it is possible to open and close a cover 16 without reaching over food on the grid 8 or over the fuel burner 19.

The first or upper position 26 of the food supporting grid 8, as shown in FIG. 4, has the other side edge portion 10 thereof supported on the upper ledge 12 on the rear wall 5 and the one side edge portion 9 suppported on the lower ledge 13 on front side wall 4. The connecting portion 25 extends generally upwardly from the lower ledge 13. In the upper or first positions 26, the center portion 15 of the grid 8 is substantially level and aligned with the upper ledge 12 on the rear side wall 5.

The food supporting grid 8 is reversed or turned end-for-end from the first or upper position 26 and inverted to be mounted in an intermediate or second position 27 as shown in broken lines in FIG. 4. In the second or intermediate position 27, the other side edge portion 10 is supported on the lower ledge 13 on the front wall 4 and the one side edge portion 9 is supported on the upper ledge 12 on the rear side wall 5. The connecting portion 25 extends generally downwardly from the upper ledge 12 on the rear side wall 5. The center portion 15 is substantially level and aligned with the lower ledge 13 on the front wall 4.

In the third or lower position 28, the food supporting grid 8 is again reversed or turned end-for-end from the second or intermediate position 27 so that the other edge portion 10 is supported on the lower ledge 14 on the rear side wall 5 and the one side edge portion 9 is supported on the upper ledge 11 on the front side wall 4. The connecting portion 25 extends generally donwardly from the upper ledge 11 on the front side wall 4. The center portion 15 of the food supporting grid 8 is substantially level and aligned with the lower ledge 14 of the rear side wall 5.

The food support grid 8 may be moved from the first or upper position 26 to the third or lower position 28 by inverting the grid 8 whereby the side edge portion 10 is moved from the upper ledge 12 to the lower ledge 14 on the rear wall 5 and the side edge portion 9 is moved from the lower ledge 13 to the upper ledge 11 on the front wall 4.

The front and rear walls 4 and 5 diverge outwardly from the bottom wall 3 whereby there is a greater lateral spacing between the walls 4 and 5 on a horizontal plane through the upper ledge 12 than on a horizontal plane through the lower ledge 14 on the rear wall 5. The grid 8 has uniform spacing between the side members 9 and 10 whereby the lower ledge 13 on the front wall 4 is used for the positions 26 and 27 and the upper ledge 11 is used for the lower position 28.

The arrangement of opposed edge portions of the grid at different levels and the support members on ledges on opposed levels are such as to permit turning the grid and obtaining different levels of food support provides a substantially versatile cooking device and food supporting grid therefor.

It is to be understood that while I have illustrated and described one form of my invention, it is not to be limited to the specific form or arrangement of parts herein described and shown.

What I claim and desire to secure by Letters Patent is:

1. A cooking device comprising:
   a. a cooking compartment having integral bottom and upstanding spaced opposed walls;
   b. heat supplying means positioned in a lower portion of said compartment;
   c. certain opposed walls having portions forming ledges providing upwardly facing support surfaces with the wall portion above a support surface being outward relative to the wall portion therebelow;
   d. said ledges on the opposed walls being arranged to provide an upper support surface and a lower support surface on one of said opposed walls and first and second support surfaces on the other of said opposed walls, said first support surface being below said second support surface, and said upper and lower support surfaces having greater vertical spacing than said first and second support surfaces;
   e. a food supporting grid having a center portion and opposed side members arranged to rest on support surfaces on ledges of the opposed walls, said side members being at different levels relative to said center portion;
   f. said ledges on said opposed walls and the spacing of said grid side members being vertically related for supporting the grid with the center section substantially horizontal at selected low, intermediate and high levels, whereby reversing and inverting and resting the side members on respective support surfaces permits the grid to be adjusted to the selected level.

2. A cooking device as set forth in claim 1 wherein:
   a. said upper support surface on said one opposed wall is higher than said second support surface on said other opposed wall;
   b. said lower support surface on said one opposed wall is lower than said first support surface on said other opposed wall;

3. A cooking device as set forth in claim 2 wherein:
   a. said grid side members have side edges;
   b. said grid side member edges and said wall portions above the respective ledge supporting same cooperating to limit movement of the grid and retain said side members on the respective supporting surface.

4. A cooking device as set forth in claim 3 wherein:
   a. said side members of said grid of resting on the supporting surfaces being substantially parallel;
   b. said supporting surfaces on said ledges being elongate substantially flat surfaces.

5. A cooking device as set forth in claim 4 wherein:
   a. said grid is substantially planar with one side member in the same plane and the other side member spaced therefrom;
   b. a connecting portion between said other side member and the center portion of the grid, said connecting portion being a wall and a heat barrier when the grid is at the high level.

6. A cooking device as set forth in claim 2 wherein:
   a. the grid is supported at the low level with one side member resting on said first support surfaces and the other side member resting on said lower support surface on said one of said opposed walls, and turning and raising the grid to rest said other member on said first support surface and said one side member on said upper support surface positons the grid center portion at the intermediate level and inverting the grid from its position at the low level and positioning the other side member on said upper support surface and said one side member on said second support surface positions the grid center portion at the high level.

7. A cooking device comprising:
   a. a cooking compartment having integral bottom and upstanding spaced opposed walls with certain of said opposed walls diverging upwardly and outwardly from said bottom wall;
   b. heat supplying means positioned in a lower portion of said compartment;
   c. said certain opposed walls having portions forming ledges providing upwardly facing support surfaces with the wall portion above a support surface being outward relative to the wall portion therebelow;
   d. said ledges on the opposed walls being arranged to provide an upper support surface and a lower support surface on one of said opposed walls and first and second intermediate support surfaces on the other of said opposed walls;
   e. a food supporting grid having a center portion and opposed side members with support portions carried thereby, said support portions having side edges and being arranged to rest on support surfaces on ledges of the opposed walls, with said center portion horizontal and one of said support portions vertically spaced from said center portion;
   f. said ledges on said opposed walls and the spacing of the grid center portion and spaced support portion being vertically related for supporting the grid with the center section substantially horizontal at selected low, intermediate and high levels, the grid being supported at the low level with the spaced support portion resting on the first intermediate support surface and the other support portion resting on the lower support surface on said one wall, and turning and raising the grid to rest said other support portion on said first intermediate support surface and said spaced support portion on said upper support surface positions the grid center portion at the intermediate level and inverting the grid from its position at the low level and positioning the other support portion on said upper support surface and said spaced support portion on said second intermediate support surface positions the grid center portion at the high level, said side edges of the support portions and said wall portions above the respective ledges limiting movement of the grid to retain the support portions on the respective ledges.

* * * * *